Nov. 16, 1954     T. B. MURDOCK     2,694,457

FUEL VALVE FOR PROPELLER BLADE JET UNIT

Filed Jan. 13, 1953     3 Sheets-Sheet 1

INVENTOR.
THOMAS B. MURDOCK
BY Wade Koontz AND
Frederick W. Cotterman
ATTORNEYS

Nov. 16, 1954  T. B. MURDOCK  2,694,457
FUEL VALVE FOR PROPELLER BLADE JET UNIT
Filed Jan. 13, 1953  3 Sheets-Sheet 2

INVENTOR.
THOMAS B. MURDOCK
BY Wade Koontz AND
Frederick W. Cotterman
ATTORNEYS.

Nov. 16, 1954   T. B. MURDOCK   2,694,457
FUEL VALVE FOR PROPELLER BLADE JET UNIT
Filed Jan. 13, 1953   3 Sheets-Sheet 3
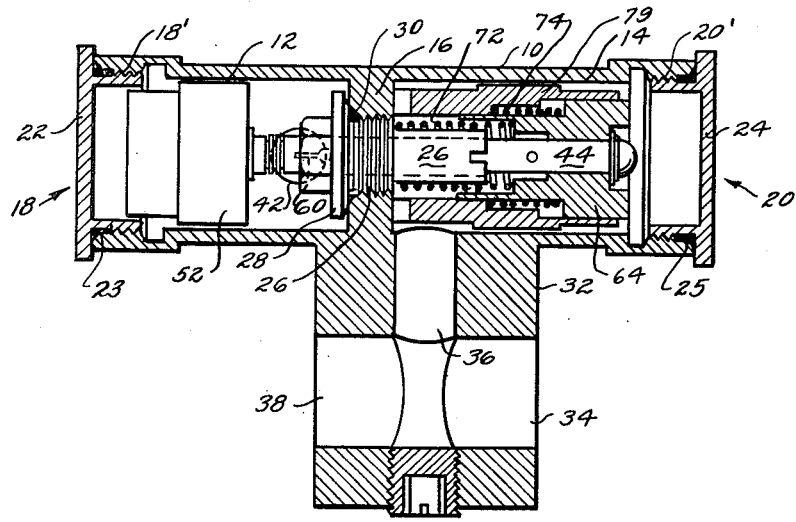
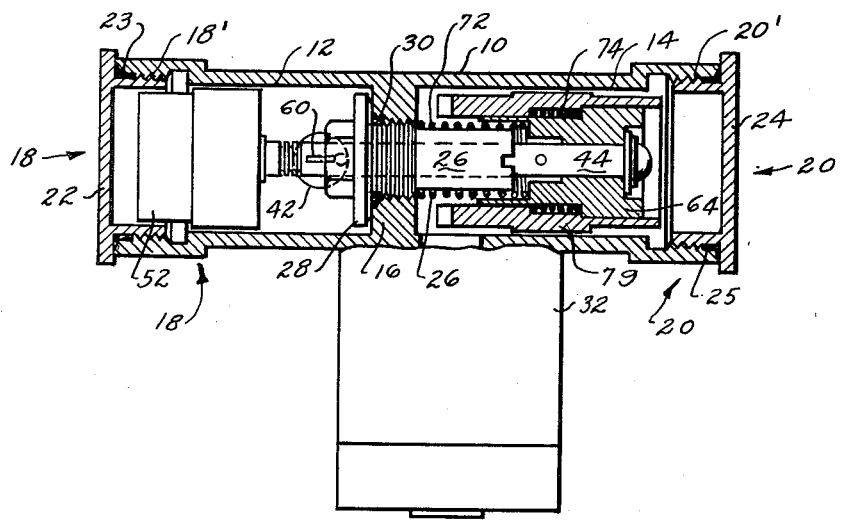
INVENTOR.
THOMAS B. MURDOCK
BY Wade Koontz AND
Frederick W. Cotterman
ATTORNEYS

United States Patent Office 2,694,457
Patented Nov. 16, 1954

2,694,457

FUEL VALVE FOR PROPELLER BLADE JET UNIT

Thomas B. Murdock, Scotia, N. Y., assignor to the United States of America as represented by the Secretary of the Air Force Application January 13, 1953, Serial No. 330,985

5 Claims. (Cl. 170—135.4)

This invention relates to a centrifugal balance valve and is particularly effective for use as a fuel control valve on jet burners such as are used on the wing tips of a helicopter.

In aircraft such as the helicopter in which jet power plants and the necessary fuel valves are carried on the wing tips of the rotor, rotation of the rotor creates a tremendous pressure on the fuel being fed to the burner due to the centrifugal force generated. To meet this situation a combination of balance weights and springs are so arranged as to neutralize the centrifugal force and thus maintain a substantially normal pressure, i. e., the pump pressure at all speeds of rotation of the helicopter rotor.

The object of the invention is to provide a device capable of functioning as above stated at minimum cost and maximum effectiveness.

Figure 1:
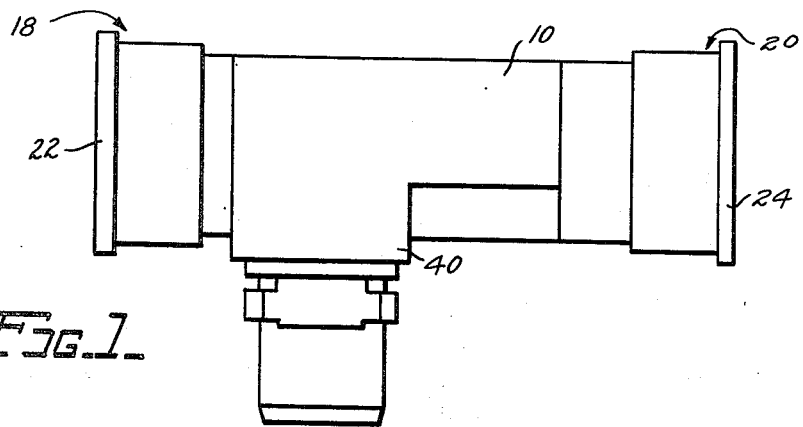
Figure 2:
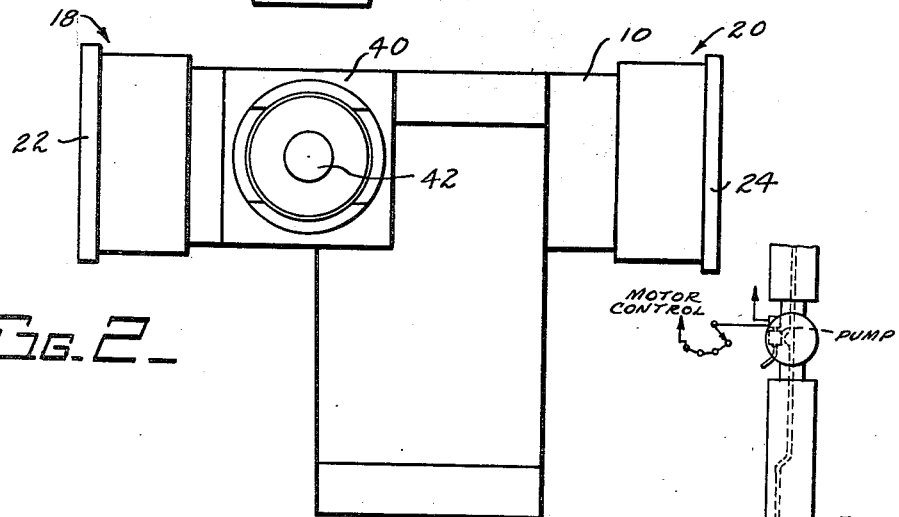
Figure 3:
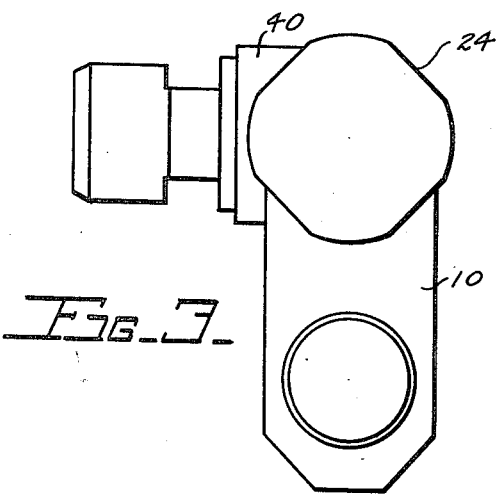
Figure 7:
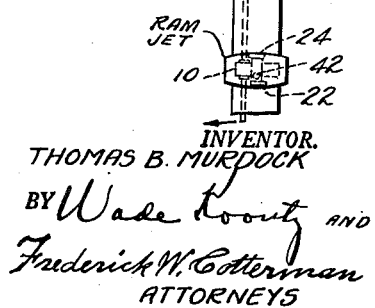
Figure 4:
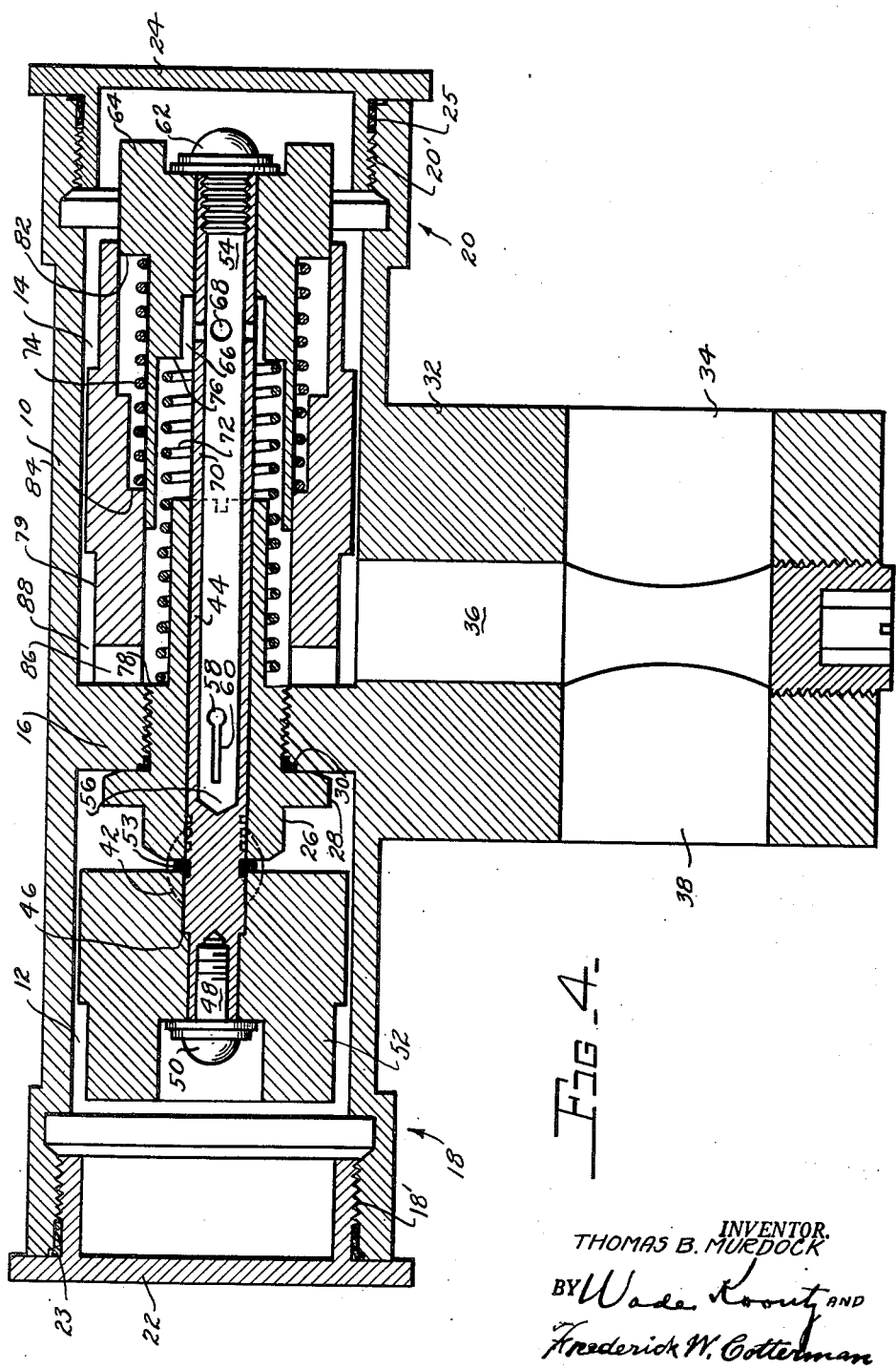

I attain the above and other objects in the device hereinafter described, reference being had to the drawings, wherein:

Fig. 1 is a plan view of the completed valve;
Fig. 2 is a side view of the valve as shown in Fig. 1;
Fig. 3 is a right-hand end view of the valve;
Fig. 4 is an axial section through the valve showing the inner structure and the arrangement of the movable parts of the device such as the balance weights, floating weight and other operative valve parts.
Figs. 5 and 6 are views similar to Fig. 4 except that the movable parts have changed to other positions as may be required in operation.
Fig. 7 is a fragmentary schematic view showing a portion of a helicopter rotor having a fuel metering system embodying my invention.

Similar reference characters are used to refer to similar parts throughout the several views.

As shown in the drawings, a cylindrical housing 10 contains the operative parts of the subject valve. The housing 10 is bored as at 12 and 14 to substantially the same diameter being bored from both ends to near midway of the length, leaving an integral wall 16 which is bored to a smaller diameter.

At the outer ends of the housing 10 the bore is internally threaded as at 18' and 20' for the externally threaded caps 22 and 24. Gaskets 23 and 25 seal the caps against leakage, the end 18 of the valve being referred to as the inboard end and the end 20 of the valve being referred to as the outboard end, since the end 18 is the closer to the axis of rotation of the rotor.

The integral wall 16, which is bored to a smaller diameter than the remainder of the bore, is internally threaded for the externally threaded sleeve 26 which is screwed into place with the shoulder 28 on the sleeve against the side of the integral wall 16. Hydraulic packing 30 guards against leakage between the internally threaded parts 16 and the externally threaded parts 26.

An integral extension 32 extends from the cylindrical portion of the housing 10. This extension has three passageways 34, 36 and 38. An integral boss 40 extends from the back of the housing 10. Boss 40 contains a single passageway 42.

The fuel from the pump (not shown) enters at 34, passes upward through passageway 36, through the valve and out through the passageway 42 to the burner (not shown). The fuel controls at the burner normally accept much less fuel than enters at 34 so that the excess passes out through passageway 38 to the next valve and so on until all of the burners with their valves, which may preferably equal the number of propeller blades, have been served. The foregoing constitute only the fixed elements of the invention disclosed. The movable elements may be described as follows:

A shaft 44, coaxially positioned within the housing 10, extends substantially from the inboard to the outboard end. Shaft 44 is slidable axially in the stationary sleeve 26.

At the inboard end, the shaft 44 is shouldered as at 46, then drilled and tapped at 48 for the screw 50. The inboard balance weight 52 is made fast on the end of the shaft 44 by this screw 50, the weight 52 being counterbored for the head of the screw.

An O ring 53 is fitted tightly into a groove in the shaft 44 and made to protrude slightly out from the groove for reasons as will be hereinafter stated in describing the operation of the device.

At the outboard end, the shaft 44 is provided with an opening 54 which extends to a depth 56, and is cross drilled as at 58 and slotted as at 60, the slots 60 extending through the wall of the shaft into the opening 54.

At the extreme outboard end, the shaft 44 is tapped for the screw 62 which holds the outboard balance weight 64 from moving axially on the shaft 44 in an outboard direction. The outboard balance weight 64 is counterbored at the end to clear the head of the screw 62.

The outboard balance weight 64 is also counterbored at 66, and a circular row of circumferentially equally spaced holes 68 is cross drilled through the wall 70 of the shaft 44 into the opening 54. The outboard balance weight 64 is increased in diameter inside and decreased in diameter outside to accommodate the springs 72 and 74, respectively. Spring 72 is held in compression between the shoulder 76 of the outboard balance weight 64 and a shoulder 78 on the sleeve 26.

A floating balance weight 79 is slidable at its ends on the outboard balance weight 64, space being left between for the spring 74 which is held in compression between shoulders 82 and 84 on the outboard balance weight 64 and the floating balance weight 79. Grooves 86 are cut across the end of the floating balance weight 79 to serve as a part of the passageway for incoming fuel.

The operation of the valve which is the subject of this application may preferably be substantially as follows:

Operation

The jet fuel coming from the pump (not shown) enters the centrifugal balance valve at 34, passes upwardly through passageway 36, passes next in greater part through the notches 86 into the space 88 and through space 88 into the counterbore 66, then through the holes 68 to the inside 54 of the shaft 44, then through the inside 54 toward the inboard end to the slots 60. As long as there is neither pump pressure within the valve, nor rotation of the rotor blade which is carrying the valve, the slots remain closed against fuel flow because they are drawn back onto the sleeve 26, and the springs 72 and 74 hold the valve as in Fig. 4 where the force of the springs 72 and 74 is applied to clamp the O ring 53 between the weight 52 and the end of the sleeve 26, whereby all dribble at the inboard valve, while the valve is closed, is eliminated.

After starting the rotor, the fuel will enter the outboard end of the valve with fuel pump pressure plus centrifugal fuel pressure. When the valve shaft 44 moves inboard the fuel will throttle out through the slot 60 and will leave the valve by the outlet port and at a pressure equal to the fuel pump pressure. From the outlet port 42 the fuel goes to the jet burners and is burned. The springs 72 and 74 are of such size that no fuel passes through the slots 60 until a pressure of at least 15 p. s. i. has been reached.

As an example when a pump pressure of as much as 30 p. s. i. is applied but without rotation of the rotor (not shown), i. e., at zero R. P. M. the movable parts assume the position shown in Fig. 5, and for another example when more than 10 p. s. i. fuel pressure is applied at more than 20 R. P. M., the valve assumes the position shown in Fig. 6 where the slots 60 are protruding from the end of the sleeve 26 and are in communication with the passageway 42.

Spring 74 has inboard end resting against shoulder 84 of weight 79 while spring 72 has inboard shoulder resting against shoulder 78 of sleeve 26.

With the rotor blades in which the valve devices are mounted in stationary position, or rotating very slowly the centrifugal force on the weights 64, 79 and 52 is zero or very low and the fuel pump pressure only is effective in the inboard end direction on the hollow valve stem 44 to move the stem against the tension of the two springs 72 and 74, floating weight being in abutment relation with the outboard side of the wall 16 of the housing 10, fuel from passage 36 passing through slots 86 and interior of weights and ports 68 to interior of valve stem 44. The centrifugal force on the fuel mass in the fuel delivery conduits (not shown) running from the center of rotation of the rotor blades to the valve device of the subject invention at the tips is also zero or very low.

Figure 5 shows valve 44 moved to slightly uncover the inboard end of port 60 by pump pressure and feed fuel to the jet burners (not shown) at the tips of the blades. When fuel pressure is cut off both springs 72 and 74 are now effective to move the valve stem 40 in outboard direction to its "cutoff" position shown in Fig. 4, and O ring 53 is clamped between inboard weight 52 and inboard end of valve guide sleeve 26, cutting off fuel flow completely and preventing any slight seepage or dribbling of fuel to the burners. With the valve parts as shown in Fig. 5 fuel is being fed to the jet propulsion devices (not shown) at the tips of the rotor blades, causing the rotor speed to increase. As the rotor speeds up the centrifugal force on the fuel mass in the pipes from the fuel pump leading along the rotor blades to the valve devices build up and this increases the fuel pressure at the fuel intake passages 34 and 36 creating a materially increased inboard direction fuel pressure inside of the hollow valve stem 44, tending to open the port 60 further and feed more fuel to the jet burners at the wing tip. At the same time the centrifugal force on the two weights 52 and 64 becomes more effective in the opposite (or outboard) direction to close the valve ports 60.

As the speed of the rotor increases the third or balance weight 79 slides outwardly on the weight 64 compressing the spring 74 until the weight 79 moves outwardly to its limit position with its annular inner shoulder abutting the shoulder 82 on weight 64, also opening the closed ends of the lateral fuel passages 86 to provide a greater or less obstructed fluid delivery area from the passage 88, to the fuel inlet openings 68 and the interior of the valve stem 44.

As the balance weight moves outwardly a greater distance than the outward movement of the central valve stem 44 and its integral weight, or weights (with respect to the center of rotation of the helicopter rotor blades) the central force of the balance weight 79 in its extreme outboard position (in impingement contact with shoulder 82 and weight 64) is increased materially from the position when the inboard end of the weight 79 was in impingement contact with the closure wall 16. The change in position of the weight 79 on the weight 64 from position shown in Fig. 5 to that shown in Fig. 6 shows the relative change in position of the balance valve from its minimum radial controlling position (in Fig. 5) to its maximum control position (in Fig. 6). The weights of course have predetermined masses relative to the mass or weight of the fuel in the fuel supply conduits leading from the center of the rotor outwardly along or in the rotor blades such that the change in fuel pressure due to centrifugal force on the fuel in these passages, tending to force the valve 44 inboard is balanced by the weights 52, 64 and 74 tending to move the valve stem 44 outboard. These forces in effect, cancel out during the normal operation or rotation of the rotor leaving the normal pump pressure on the fuel effective to move the valve stem inboard, as shown in Fig. 6, and the opposing tension of the spring 72 effective to urge the valve stem to its outboard fuel throttling, or closed position. When the rotor slows down sufficiently to reduce the centrifugal force on weight 79 below the compression forces of spring 74, the balance weight 79 moves inwardly to position shown in Fig. 5 receiving its centrifugal force (because radius of rotation is smaller) and spring 74 becomes directly effective between the wall 16 (through weight 79) and the weight 64 to assist spring 72 in moving the valve stem 44 to close the fuel delivery ports 60 and clamp the gasket 53 as described, between the end of the sleeve 26 and the weight 52 to prevent leakage or dribbling of the fuel, when fuel pressure is reduced below 15 pounds per square inch. A reduction in pump pressure below 15 lbs. (or a minimum predetermined pressure as determined by the weights 52, 64 and 79), and predetermined tension of springs 72 when rotor is rotating normally will produce a similar closing. This, however, is by the centrifugal force on the weight moving the valve in the outboard direction against the under minimum fuel pump pressure.

Having described my invention, I claim:

1. In a balanced centrifugal fuel control valve for helicopter blade tip jet propulsion motors comprising an elongated hollow housing closed at both ends having a transverse wall portion intermediate its ends dividing the interior of the housing into an outboard fuel inlet chamber at one end adapted to be connected to a fuel supply line from the center of rotation of the helicopter blade and an inboard fuel delivery chamber at the other end adapted to be connected to the burner of the jet propulsion motor when located at the outboard end of the helicopter blade, a movable shaft valve member having a fuel port therein for controlling fuel delivery from said fuel inlet chamber to said fuel delivery chamber and progressively shiftable within the housing toward said fuel delivery chamber to admit and increase fuel flow thereinto from the fuel inlet chamber and progressively shiftable toward said fuel inlet chamber to progressively decrease and interrupt fuel flow from the inlet chamber, first valve spring means operative between the shaft valve member and the housing yieldably urging the shaft valve member toward the fuel inlet chamber to close the valve against a predetermined minimum fuel pressure therein, a first centrifugal weight means connected to the shaft valve urging said shaft valve member to closed position against a predetermined increase in inlet fuel pressure in said inlet chamber during application of centrifugal force on the fuel in the fuel supply line to the inlet chamber and centrifugal force on said first weight means when the device is mounted on a helicopter blade tip with the inlet chamber connected to the fuel supply line leading from the center of rotation of the blade, a second centrifugally operated weight means in said housing movable relative to the first centrifugal weight means toward the outlet chamber into abutting relation with the housing, and movable independently of the first mentioned centrifugal force actuated weight means into abutting relation with said first mentioned centrifugal force actuated weight means, and a second spring means intermediate the second centrifugal force actuated weight means and the first centrifugal force actuated weight means for urging said shaft valve toward said fuel inlet chamber in conjunction with the first spring means when the second weight means is in the aforesaid abutting relation with the housing, and to impinge and assist the first weight means to move the shaft valve means toward the fuel inlet chamber upon movement of the second weight means by centrifugal force into abutting relation with the first weight means.

2. In a balanced centrifugal fuel control valve for helicopter blade tip jet propulsion motors comprising an elongated hollow valve housing closed at both ends having a transverse wall dividing the interior of the housing into an outboard fuel inlet chamber at one end adapted to be mounted with said outboard chamber extending radially outwardly of the blade and connected to a pump pressure supplied fuel delivery line extending radially outwardly approximately from the center of rotation of the blade, and an inboard fuel delivery chamber at the other end of the housing adapted to extend toward the center of rotation of the blade and connected to the burner of a jet propulsion motor when mounted at the tip portion of the blade, a shaft valve member slidably mounted for axial movement in said wall with the opposite ends thereof projecting into said inlet and outlet chambers, said shaft valve having a central fuel passage opening into said fuel inlet chamber adjacent one end and closed at its opposite end and formed with a transverse fuel delivery port means adapted to be controlled by the transverse wall portion incident to axial movement of the shaft valve toward the tip end of the blade, a first centrifugal weight means fixed on the shaft valve, spring means operable between the transverse wall portion and the first centrifugal weight means for moving said weight means toward the tip end of the blade, second centrifugal weight means within the inlet fuel chamber axially movable relative to the first centrifugal weight means toward the tip end of the blade, stop means on the second weight means for abutting engagement with said transverse wall limiting inboard movement of said second weight means toward said fuel delivery chamber, means on said second weight means for impinging engagement with said first weight means upon movement of the second weight means toward the tip end of the blade limiting outboard movement of the second weight means relative to the first weight means, spring means operable between said first weight means and said second weight means yieldably urging said second weight means toward the fuel delivery chamber into impinging engagement with said transverse wall.

3. Apparatus as claimed in claim 2 in which said second weight means surrounds the first weight means and is slidable thereon and the stop means comprises an annular shoulder facing inboardly from the inboard end of the second weight means and formed with fuel inlet slots in the said inboard end of the shoulder and the said transverse fuel delivery port means in the shaft valve are in communication with the annular space within the second weight means.

4. Apparatus as claimed in claim 1 in which the shaft valve carries an enlarged annular head portion at its inboard end, movable in the outlet chamber with the shaft valve incident to movement thereof away from the said transverse wall portion of the housing, incident to fuel delivery movement of the shaft valve toward the fuel outlet chamber, and movable with the shaft valve toward fuel inlet chamber to interrupt fuel flow to the fuel outlet chamber, and an annular packing ring means carried by the shaft valve adjacent said enlarged head portion constructed and arranged to be clamped between the said enlarged head portion and the said transverse wall portion to prevent fuel leakage past the shaft valve member between the said head portion and said transverse wall portion incident to maximum axial movement of said shaft valve member toward said fuel inlet chamber.

5. Apparatus as claimed in claim 4 in which the shaft valve is closed at its inboard end and formed with fuel outlet slots extending longitudinally thereof located adjacent the said annular packing ring, intermediate said packing ring and the outboard end of the shaft valve and formed with a fuel delivery passage in communication at one end with said slots, and extending axially within the shaft valve from said slots toward the outboard end of the shaft valve with its opposite end portion in communication with the fuel inlet chamber.

References Cited in the file of this patent

UNITED STATES PATENTS

| Number | Name | Date |
|---|---|---|
| 2,596,161 | Murdock et al. | May 13, 1952 |
| 2,622,394 | Murdock et al. | Dec. 23, 1952 |
| 2,627,718 | Edelfelt et al. | Feb. 10, 1953 |